US011685328B2

(12) United States Patent
Faruque et al.

(10) Patent No.: US 11,685,328 B2
(45) Date of Patent: Jun. 27, 2023

(54) AIRBAG HAVING MULTIPLE INFLATION CHAMBERS SUPPORTED ON A DASH (71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/243,646

(22) Filed: Apr. 29, 2021

(65) Prior Publication Data
US 2022/0348160 A1 Nov. 3, 2022

(51) Int. Cl.
*B60R 21/205* (2011.01)
*B60R 21/233* (2006.01)
*B60R 21/2338* (2011.01)
*B60R 21/231* (2011.01)

(52) U.S. Cl.
CPC .......... *B60R 21/205* (2013.01); *B60R 21/233* (2013.01); *B60R 21/2338* (2013.01); *B60R 2021/23169* (2013.01); *B60R 2021/23386* (2013.01)

(58) Field of Classification Search
CPC ... B60R 21/205; B60R 21/206; B60R 21/233; B60R 21/2338; B60R 21/239; B60R 2021/23169; B60R 2021/23308; B60R 2021/23316; B60R 2021/23324; B60R 2021/23386
See application file for complete search history.

(56) References Cited

U.S. PATENT DOCUMENTS

| 3,610,657 A * | 10/1971 | Cole | B60R 21/26 280/729 |
| 3,642,303 A * | 2/1972 | Irish | B60R 21/233 280/730.1 |
| 3,741,580 A * | 6/1973 | Vos | B60R 21/233 280/737 |
| 3,767,225 A * | 10/1973 | Mazelsky | B60R 21/233 280/729 |

(Continued)

FOREIGN PATENT DOCUMENTS

| JP | 58110339 A * | 6/1983 | |
| JP | 10071911 A * | 3/1998 | B60R 21/203 |

(Continued)

*Primary Examiner* — Laura Freedman
(74) *Attorney, Agent, or Firm* — Frank A. MacKenzie; Bejin Bieneman PLC (57) ABSTRACT

An assembly for a vehicle includes a dash. The assembly includes an airbag supported by the dash and being inflatable to an inflated position. The airbag includes a knee chamber, a chest chamber supported by the knee chamber in the inflated position, and a head chamber supported by the chest chamber in the inflated position. The chest chamber is connected to the knee chamber at a lower seam that defines a lower fluid pathway. The head chamber is connected to the chest chamber at an upper seam that defines an upper fluid pathway. The assembly includes an inflator supported by the dash and being connected directly to the knee chamber.

20 Claims, 4 Drawing Sheets

(56) References Cited

U.S. PATENT DOCUMENTS

| | | | |
|---|---|---|---|
| 3,768,830 A * | 10/1973 | Hass | B60R 21/233 280/732 |
| 4,265,468 A * | 5/1981 | Suszko | B60R 21/2346 280/740 |
| 4,290,627 A * | 9/1981 | Cumming | B60R 21/2338 280/740 |
| 5,240,283 A * | 8/1993 | Kishi | B60R 21/233 280/743.1 |
| 5,513,877 A * | 5/1996 | MacBrien | B60R 21/233 280/743.2 |
| 6,431,586 B1 * | 8/2002 | Eyrainer | B60R 21/213 280/732 |
| 6,913,283 B2 * | 7/2005 | Heym | B60R 21/233 280/743.1 |
| 6,916,039 B2 | 7/2005 | Abe | |
| 7,434,837 B2 | 10/2008 | Hotta et al. | |
| 7,731,229 B2 * | 6/2010 | Song | B60R 21/261 280/732 |
| 7,758,069 B2 | 7/2010 | Enders | |
| 7,766,374 B2 | 8/2010 | Abele et al. | |
| 7,963,550 B2 | 6/2011 | Hong et al. | |
| 8,215,665 B2 | 7/2012 | Ohara et al. | |
| 8,376,396 B2 * | 2/2013 | Miller | B60R 21/206 280/736 |
| 8,590,928 B2 * | 11/2013 | Spahn | B60R 21/23 280/739 |
| 8,641,085 B2 | 2/2014 | Przybysz et al. | |
| 8,696,020 B2 * | 4/2014 | Tanaka | B60R 21/233 280/743.1 |
| 9,296,358 B2 | 3/2016 | Chen et al. | |
| 9,308,883 B1 * | 4/2016 | Schneider | B60R 21/231 |
| 9,533,650 B2 * | 1/2017 | Le Norcy | B60R 21/231 |
| 9,592,787 B2 | 3/2017 | Jung et al. | |
| 9,707,921 B2 * | 7/2017 | Fischer | B60R 21/213 |
| 9,771,049 B2 * | 9/2017 | Lee | B60R 21/232 |
| 9,815,429 B2 * | 11/2017 | Schneider | B60R 21/239 |
| 10,336,279 B2 * | 7/2019 | Farooq | B60R 21/231 |
| 10,486,635 B2 * | 11/2019 | Karlow | B60R 21/207 |
| 10,525,927 B2 * | 1/2020 | Fischer | B60R 21/231 |
| 10,583,799 B2 * | 3/2020 | Schneider | B60R 21/214 |
| 10,857,965 B2 * | 12/2020 | Abe | B60R 21/214 |
| 10,857,966 B2 | 12/2020 | Deng et al. | |
| 10,889,258 B2 * | 1/2021 | Jaradi | B60R 21/205 |
| 11,299,122 B2 * | 4/2022 | Choi | B60R 21/2338 |
| 2020/0094770 A1 | 3/2020 | Fischer et al. | |
| 2020/0164827 A1 | 5/2020 | Oh et al. | |

FOREIGN PATENT DOCUMENTS

| | | | |
|---|---|---|---|
| JP | 2017213995 A | * 12/2017 | |
| JP | 2020164143 A | * 10/2020 | B60R 21/0132 |

\* cited by examiner

AIRBAG HAVING MULTIPLE INFLATION CHAMBERS SUPPORTED ON A DASH

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger compartments of vehicles. Vehicles may include airbags supported on a dash, side air curtains mounted to the roof rails, side airbags mounted to seats, etc.

DETAILED DESCRIPTION

An assembly includes a dash. The assembly includes an airbag supported by the dash and being inflatable to an inflated position. The airbag includes a knee chamber, a chest chamber supported by the knee chamber in the inflated position, and a head chamber supported by the chest chamber in the inflated position. The chest chamber is connected to the knee chamber at a lower seam that defines a lower fluid pathway. The head chamber is connected to the chest chamber at an upper seam that defines an upper fluid pathway. The assembly includes an inflator supported by the dash and being connected directly to the knee chamber.

The chest chamber may be connected to the inflator through the knee chamber and the lower seam.

The head chamber may be connected to the inflator through the chest chamber and the upper seam.

The knee chamber, the chest chamber, and the head chamber may each have a pressure in a fully inflated position, the pressure of the head chamber being less than the pressure of the knee chamber in the fully inflated position.

The pressure of the chest chamber may be different than the pressure of the knee chamber and the head chamber in the fully inflated position.

One of the knee chamber, the chest chamber, and the head chamber may include a first vent and another of the knee chamber, the chest chamber, and the head chamber includes a second vent sized differently than the first vent.

The airbag includes a pair of tethers external to the chambers, each of the tethers extending from the knee chamber to the head chamber.

The pair of tethers may be spaced cross-vehicle from each other.

The pair of tethers may be aligned with each other along a vehicle-longitudinal axis.

At least one of the tethers may abut the dash when the airbag is in the inflated position.

The assembly may include a second pair of tethers external to the chambers and spaced vehicle-inboard from the pair of tethers, the second pair of tethers extending from the knee chamber to the head chamber.

The assembly may include a seat, the airbag being between the dash and the seat in the inflated position.

The seat may define an occupant knee area, an occupant chest area, and an occupant head area, and the knee chamber being between the dash and the occupant knee area, the chest chamber being between the dash and the occupant chest area, the head chamber being between the dash and the occupant head area.

The assembly may include a windshield extending upwardly from the dash, the head chamber extending from the chest chamber to the windshield.

The chest chamber may extend vehicle-rearward of the knee chamber and the head chamber.

An airbag includes a knee chamber, a chest chamber connected to the knee chamber at a lower seam that defines a lower fluid pathway, a head chamber connected to the chest chamber at an upper seam that defines an upper fluid pathway, and an inflator supported by the dash and being connected directly to the knee chamber.

The chest chamber may be connected to the inflator through the knee chamber and the lower seam.

The head chamber may be connected to the inflator through the chest chamber and the upper seam.

The knee chamber, the chest chamber, and the head chamber may each have a pressure in a fully inflated position, the pressure of the head chamber being less than the pressure of the knee chamber in the fully inflated position.

The airbag may include a pair of tethers external to the chambers, each of the tethers extending from the knee chamber to the head chamber.

With reference to the Figures, wherein like numerals indicate like parts throughout the several views, an assembly 10 for a vehicle 12 includes a dash 14. The assembly 10 includes an airbag 16 supported by the dash 14 and being inflatable to an inflated position. The airbag 16 includes a knee chamber 18, a chest chamber 20 supported by the knee chamber 18 in the inflated position, and a head chamber 22 supported by the chest chamber 20 in the inflated position. The chest chamber 20 is connected to the knee chamber 18 at a lower seam 24 that defines a lower fluid pathway 26. The head chamber 22 is connected to the chest chamber 20 at an upper seam 28 that defines an upper fluid pathway 30. The assembly 10 includes an inflator 38 supported by the dash 14 and being connected directly to the knee chamber 18.

In the event of an impact to the vehicle 12, specifically, a frontal impact, the airbag 16 inflates to the inflated position to control the kinematics of an occupant in the vehicle 12 and near the airbag 16. In an example such as described herein, the airbag 16 is supported by the dash 14 that does not include a steering wheel supported by the dash 14 due to autonomous operation of the vehicle 12. The airbag 16 including the knee chamber 18, the chest chamber 20, and the head chamber 22 allows the airbag 16 to simultaneously control the kinematics of the multiple regions of the occupant's body with a single airbag 16.

Figure 1:
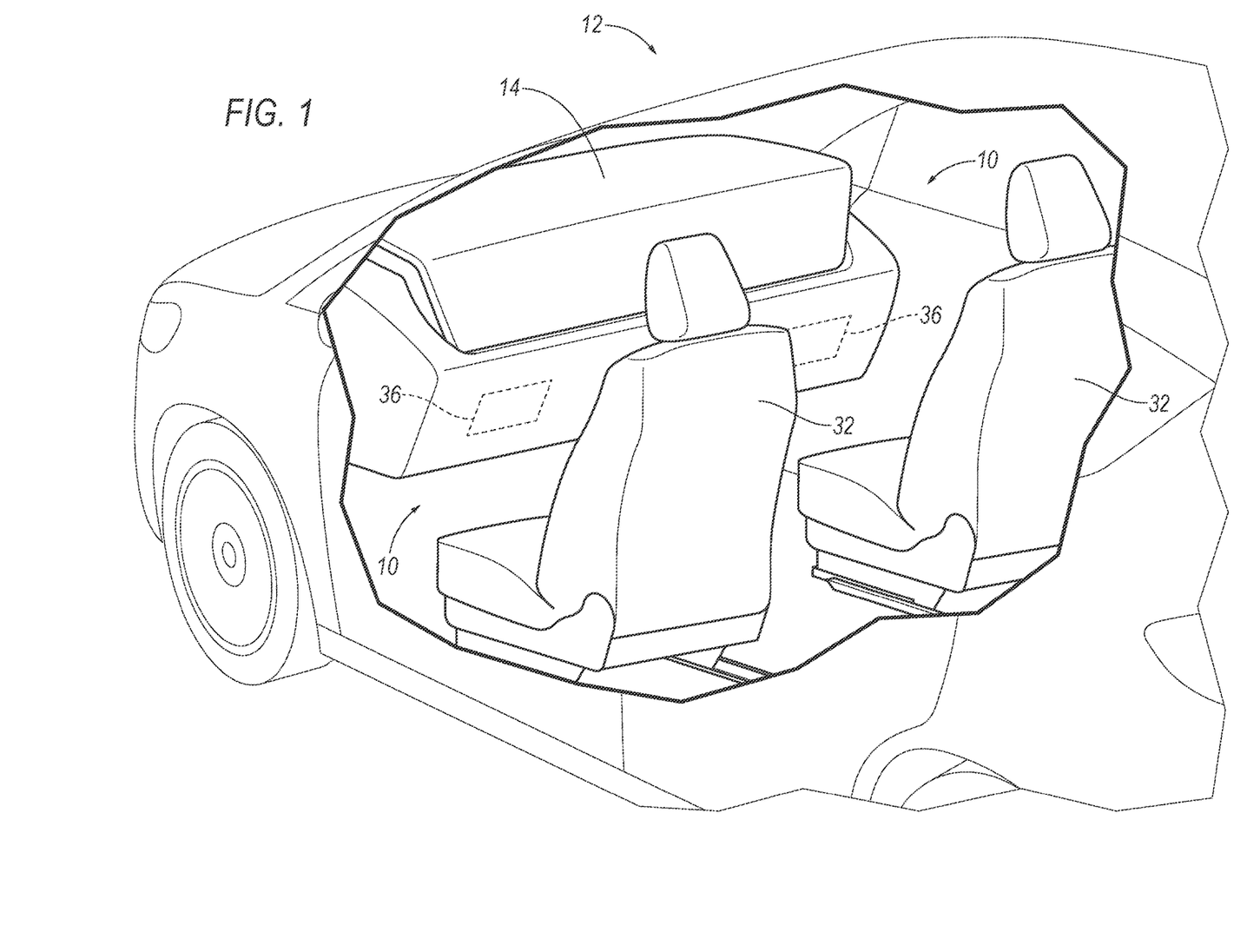
FIG. 1 is a rear perspective view of a vehicle having an airbag assembly supported by a dash in an uninflated position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a body (not numbered) including rockers, roof rails, pillars, body panels, etc. The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 may include one or more seats 32. Specifically, the vehicle 12 may include any suitable number of seats 32. The seats 32 are supported by a vehicle floor (not numbered). The seats 32 may be arranged in any suitable arrangement in the passenger compartment. As in the example shown in the Figures, one or more of the seats 32 may be at the front end of the passenger compartment, e.g., a driver seat and/or a passenger seat. In other examples, one or more of the seats 32 may be behind the front end of the passenger compartment, e.g., at the rear end of the passenger compartment. The seats 32 may be movable relative to the vehicle floor to various positions, e.g., movable fore-and-aft and/or cross-vehicle. The seats 32 may be of any suitable type, e.g., a bucket seat.

The seat 32 includes the seatback (not numbered) and a seat bottom (not numbered). The seatback may be supported by the seat bottom and may be stationary or movable relative to the seat bottom. The seatback and the seat bottom may be adjustable in multiple degrees of freedom. Specifically, the seatback and the seat bottom may themselves be adjustable. In other words, adjustable components within the seatback and/or the seat bottom, and/or may be adjustable relative to each other.

The seatback includes the seat frame (not shown) and a covering (not shown) supported on the seat frame. The seat frame may include tubes, beams, etc. Specifically, the seat frame includes a pair of upright frame members. The upright frame members are elongated, and specifically, are elongated in a generally upright direction when the seatback is in a generally upright position. The upright frame members are spaced from each other and the seat frame includes one or move cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

Each seat 32 may rotate about an axis (not shown) that extends through the vehicle roof and the vehicle floor. For example, the seats 32 may rotate between a forward-facing position and a rearward-facing position. In the forward-facing position, an occupant of the seat 32 faces the front end of the passenger compartment. In the rearward-facing position, an occupant of the seat 32 faces the rear end of the passenger compartment. The seats 32 may rotate completely, i.e., 360°, about the axis. The seats 32 may rotate between fixed positions, e.g., the forward-facing position and the rearward-facing position, or may be rotatable to an infinite number of positions.

Figure 2:
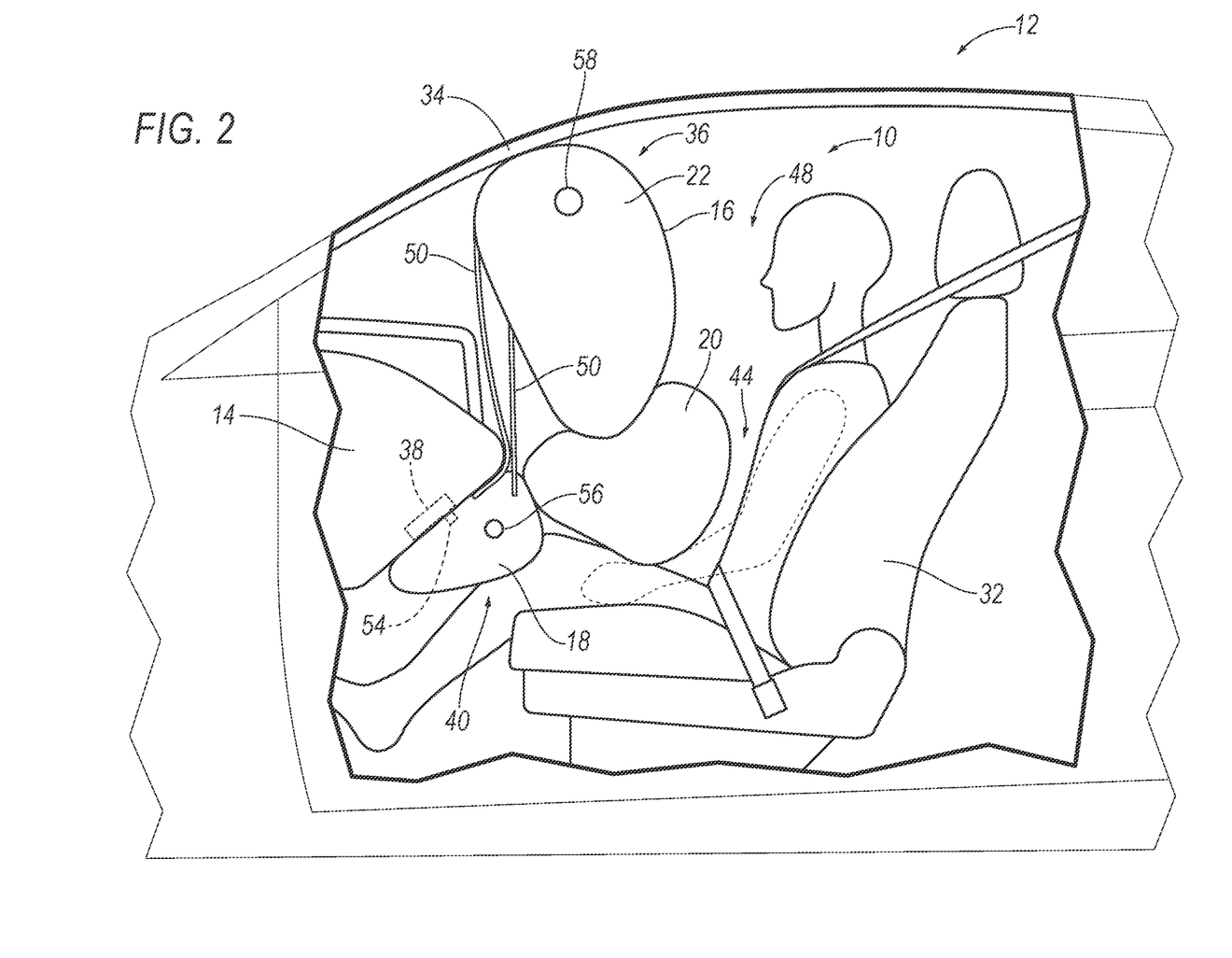
FIG. 2 is a side view of the vehicle having the airbag assembly supported by the dash in an inflated position.

With reference to FIGS. 1 and 2, the vehicle 12 includes at least one dash 14. In the example shown in the Figures, the vehicle 12 includes one dash 14 at the front end of the passenger compartment. In addition or in the alternative, the vehicle 12 may include another dash 14 at the rear end of the passenger compartment. The dash 14 may also be called a bulkhead or an instrument panel.

The dash 14 may be a structural member of a frame of the vehicle 12, i.e., a portion of the frame resists static and dynamic forces from operation of the vehicle 12 without undue deflection or distortion. Examples of forces include a weight of other vehicle 12 components, passengers, and cargo; twisting forces caused by driving over uneven surfaces; torque from a transmission; longitudinal and lateral forces from driving; and possibly forces from impacts with other vehicles or impactors.

The dash 14 may include vehicle controls, such as gauges, dials, screens, and information displays; heating and ventilation equipment; a radio and other electronics; etc. The dash 14, as well as the rest of the vehicle 12, may lack a steering wheel and may lack pedals for accelerating and braking. In other words, as shown in the Figures, no steering wheel or pedals for accelerating and braking are supported by or adjacent to the dash 14. More specifically, the vehicle 12 does not include a steering wheel or pedals for accelerating and braking, e.g., the vehicle 12 is autonomous.

The dash 14 may extend from one side of the vehicle 12 to the other side of the vehicle 12, i.e., across the passenger compartment in a cross-vehicle direction. For example, the dash 14 may extend from one body pillar to another body pillar. The dash 14 may extend downwardly from a windshield 34. For example, the dash 14 may extend from the windshield 34 to a floor of the vehicle 12.

The dash 14 may be in front of the seats 32, e.g., at the front end of the passenger compartment, as shown in FIGS. 1 and 2. In such an example, the dash 14 faces the seats 32. The dash 14 may, for example, include a class-A surface, i.e., a surface specifically manufactured to have a high quality, finished aesthetic appearance free from blemishes.

The dash 14 may, for example, be flat in the cross-vehicle direction, as shown in FIGS. 1 and 2. In other words, the dash 14 may be generally planar. Specifically, the vehicle-rearward face may be flat.

The vehicle 12 includes the windshield 34 disposed at the front end of the passenger cabin and extending above the instrument panel. The windshield 34 may extend from one side of the vehicle 12 to the other side of the vehicle 12. The windshield 34 may extend from the roof to the dash 14. Specifically, the windshield 34 extends upwardly from the dash 14 toward the roof. The windshield 34 may face in a forward direction from the passenger compartment when the vehicle 12 is in motion. The windshield 34 may be any suitably transparent material, including glass such as laminated, tempered glass or plastic.

Figure 3:
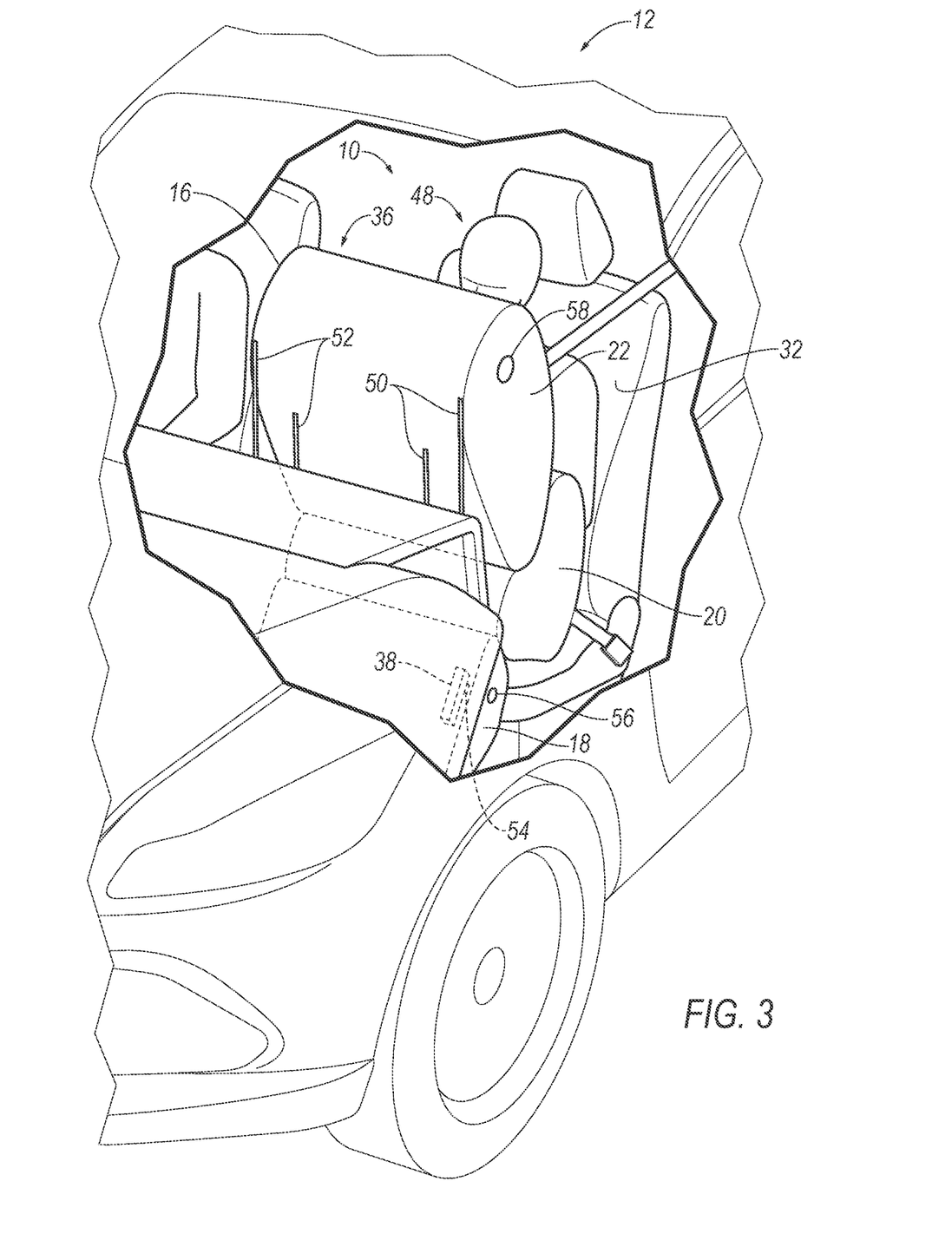
FIG. 3 is a front perspective view of the vehicle having the airbag assembly supported by the dash in the inflated position.

With reference to FIGS. 1-3, the vehicle 12 may include an airbag assembly 36 supported by the dash 14. The airbag assembly 36 includes the airbag 16, the inflator 38, and may include a housing (not shown). The vehicle 12 may include any suitable number of airbag assemblies. For example, an airbag assembly 36 may be supported by the dash 14 adjacent each of the seats 32 in the vehicle 12 that is adjacent a dash 14. In examples including more than one airbag assembly 36, the airbag assemblies may be identical or substantially identical to each other.

The inflator 38 is supported by the dash 14 and the inflator 38 is fluidly connected to the airbag 16. The inflator 38 expands the airbag 16 with inflation medium, such as a gas, to move the airbag 16 from an uninflated position to the inflated position. The inflator 38 may be, for example, a pyrotechnic inflator that ignites a chemical reaction to generate the inflation medium, a stored gas inflator that releases (e.g., by a pyrotechnic valve) stored gas as the inflation medium, or a hybrid.

In the inflated position, the airbag 16 extends from the dash 14 toward the seat 32. Specifically, the airbag 16 is between the dash 14 and the seat 32 in the inflated position. In the event of an impact to the vehicle 12, the airbag 16 controls the kinematics of a vehicle occupant in the seat 32 that is adjacent the airbag 16 and the dash 14.

Figure 4:
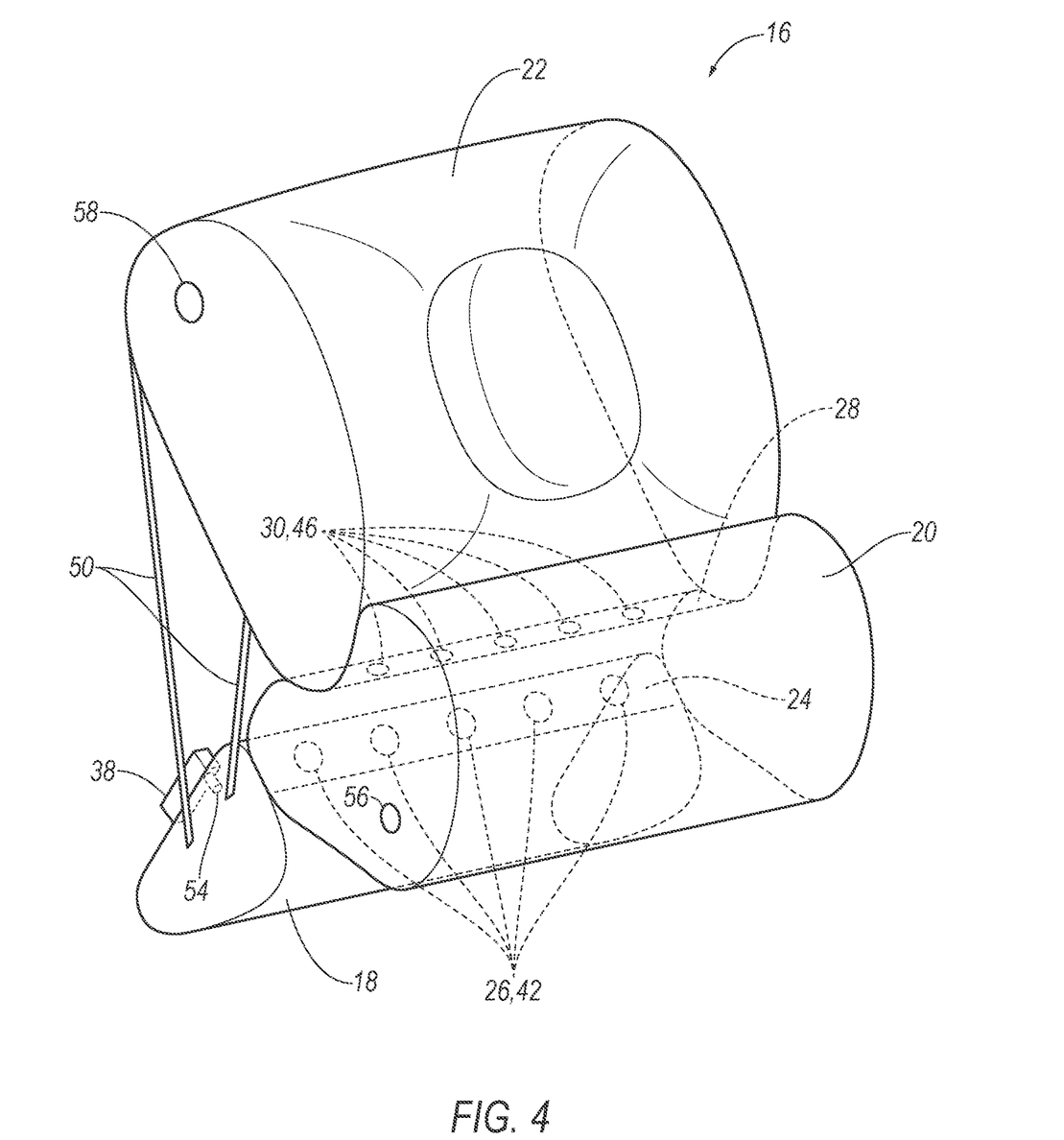
FIG. 4 is a perspective view of the airbag assembly in the inflated position.

With reference to FIGS. 2-4, the airbag 16 includes multiple inflation chambers 18, 20, 22. Specifically, the airbag 16 includes the knee chamber 18, the chest chamber 20, and the head chamber 22. In the inflated position, the knee chamber 18 is supported by the dash 14, the chest chamber 20 is supported by the knee chamber 18, and the head chamber 22 is supported by the chest chamber 20. Specifically, in the inflated position, the weight of the knee chamber 18 is supported by the dash 14 and the knee chamber 18 extends upwardly from the dash 14, the weight of the chest chamber 20 is supported by the knee chamber 18 and the chest chamber 20 extends upwardly from the knee chamber 18, and the weight of the head chamber 22 is supported by the chest chamber 20 and the head chamber 22 extends upwardly from the chest chamber 20.

As discussed above, the knee chamber 18 is supported by the dash 14 in the inflated position. In other words, the knee chamber 18 may use the dash 14 as a reaction surface in the event of an impact to the vehicle 12. The knee chamber 18 is connected directly to the inflator 38, e.g., at least a portion of the inflator 38 may be in an inflation chamber of the knee chamber 18, the airbag assembly 36 may include a fill tube 54 extending from the inflator 38 to the knee chamber 18, etc., to supply inflation medium directly from the inflator 38 to the knee chamber 18 before supplying inflation medium to the chest chamber 20 and the head chamber 22.

The seat 32 defines an occupant knee area 40. The occupant knee area 40 is the volume occupied by the knees of an occupant properly seated in the seat 32 of the vehicle 12. With reference to FIG. 2, the knee chamber 18 may be between the dash 14 and the occupant knee area 40 defined by the seat 32. Specifically, the knee chamber 18 is sized and shaped to extend between the seat 32 and the occupant knee area 40 of the seat 32, i.e., the area occupied by the knee of the occupant in the seat 32. The knee chamber 18 controls the kinematics of an occupant seated in the seat 32 of the vehicle 12, i.e., an occupant occupying the occupant knee area 40 defined by the seat 32 in the passenger compartment.

As discussed above, the chest chamber 20 is supported by the knee chamber 18 in the inflated position. The chest chamber 20 extends upwardly from the knee chamber 18 in the inflated position. Specifically, the chest chamber 20 is connected to the knee chamber 18 at a lower seam 24 and extends upwardly from the knee chamber 18. The lower seam 24 may include stitching to connect the chest chamber 20 to the knee chamber 18.

The chest chamber 20 is indirectly connected to the inflator 38 to move the chest chamber 20 to the inflated position. Specifically, the chest chamber 20 is connected to the inflator 38 through the knee chamber 18 at the lower seam 24. The lower seam 24 may allow inflation medium from the inflator 38 to pass through the knee chamber 18 and into the chest chamber 20 to move the chest chamber 20 to the inflated position. In other words, the lower seam 24 defines a lower fluid pathway 26 to allow inflation medium from the inflator 38 to inflate the chest chamber 20 to the inflated position. Specifically, the lower seam 24 may define a plurality of internal vents 42 to allow the inflation medium from the inflator 38 to pass into the chest chamber 20. As the inflator 38 inflates the chest chamber 20, the inflation medium pass from the inflator 38, through the knee chamber 18 and through the internal vents 42 to inflate the chest chamber 20.

The chest chamber 20 extends vehicle-rearward of the head chamber 22 and the knee chamber 18. In other words, the chest may extend farther into the passenger compartment from the dash 14 than the knee chamber 18 and the head chamber 22 when the airbag 16 is in the inflated position.

The seat 32 defines an occupant chest area 44. The occupant chest area 44 is the volume occupied by the chest of an occupant properly seated in the seat 32 of the vehicle 12. With reference to FIG. 2, the chest chamber 20 may be between the dash 14 and the occupant chest area 44 defined by the seat 32. Specifically, the chest chamber 20 is sized and shaped to extend between the seat 32 and the occupant chest area 44 of the seat 32, i.e., the area occupied by the chest of the occupant in the seat 32. The chest chamber 20 controls the kinematics of an occupant seated in the seat 32 of the vehicle 12, i.e., an occupant occupying the occupant chest area 44 defined by the seat 32 in the passenger compartment.

As discussed above, the head chamber 22 is supported by the chest chamber 20 in the inflated position. The head chamber 22 extends upwardly from the chest chamber 20 to the windshield 34 in the inflated position, i.e., the head chamber 22 may abut the windshield 34 in the inflated position. Specifically, the head chamber 22 is connected to the chest chamber 20 at an upper seam 28 and extends upwardly from the chest chamber 20. The lower seam 24 may include stitching to connect the chest chamber 20 to the knee chamber 18. The chest chamber 20 may include a valley that supports the head chamber 22. The head chamber 22 extends upwardly from the valley of the chest chamber 20.

The head chamber 22 is indirectly connected to the inflator 38 to move the head chamber 22 to the inflated position. Specifically, the head chamber 22 is connected to the inflator 38 through the knee chamber 18 and the chest chamber 20 at the upper seam 28. The upper seam 28 may allow inflation medium from the inflator 38 to pass through the knee chamber 18 and the chest chamber 20 into the head chamber 22 to move the head chamber 22 to the inflated position. In other words, the upper seam 28 defines an upper fluid pathway 30 to allow inflation medium from the inflator 38 to inflate the head chamber 22 to the inflated position. Specifically, the upper seam 28 may define a plurality of internal vents 46 to allow inflation medium from the inflator 38 to pass into the head chamber 22.

The seat 32 defines an occupant head area 48. The occupant head area 48 is the volume occupied by the head of an occupant properly seated in the seat 32 of the vehicle 12. With reference to FIG. 2, the head chamber 22 may be between the dash 14 and the occupant head area 48 defined by the seat 32. Specifically, the head chamber 22 is sized and shaped to extend between the seat 32 and the occupant head area 48 of the seat 32, i.e., the area occupied by the head of the occupant in the seat 32. The head chamber 22 controls the kinematics of an occupant seated in the seat 32 of the vehicle 12, i.e., an occupant occupying the occupant head area 48 defined by the seat 32 in the passenger compartment. As shown in FIG. 4, the head chamber 22 may be designed to receive the head of the occupant in the seat 32 in the event of an impact to the vehicle 12.

The knee chamber 18, the chest chamber 20, and the head chamber 22 each have a pressure in a fully inflated position, i.e., when the airbag 16 is filled completely with inflation medium by the inflator 38. The pressures of the inflation chambers 18, 20, 22 may be different from each other in the fully inflated position. Specifically, the inflation chambers 18, 20, 22 may be designed to have different pressures in the fully inflated position. For example, one of the knee chamber 18, the chest chamber 20, and the head chamber 22 includes a first vent 56 and another of the knee chamber 18, the chest chamber 20, and the head chamber 22 includes a second vent 58 sized differently than the first vent 56. As shown in the example shown in FIGS. 2 and 3, the knee chamber 18 may include the first vent 56 and the head chamber 22 may include the second vent 58 sized differently, i.e., larger, than the first vent 56. In the example shown in FIG. 4, the chest chamber 20 may include the first vent 56 and the head chamber 22 may include the second vent 58 sized differently, i.e., larger, than the first vent 56. In each of the examples shown in FIGS. 2 and 4, the pressure of the head chamber 22 is less than the pressure of the knee chamber 18 in the fully inflated position due to the second vent 58 being sized larger than the first vent 56. In such examples, the chest chamber 20 may be different than the pressures of the knee chamber 18 and the head chamber 22 in the fully inflated position due to the locations of the first vent 56 and the second vent 58. Any suitable location for the first vent 56 and the second vent 58 may be used in the airbag 16 and may be determined based on the design of the airbag 16.

As shown in FIGS. 2-4, the airbag 16 includes a pair of tethers 50 external to the chambers. The tethers 50 external to the chambers maintain the shape of the inflation chambers 18, 20, 22 when the airbag 16 is in the inflated position. Each of the tethers 50 extends from the knee chamber 18 to the head chamber 22. The tethers 50 may be of different lengths, i.e., one of the pair of tethers 50 may be longer than the other of the pair of tethers 50. The longer of the tethers 50 may extend from the knee chamber 18 to a location on the head chamber 22 adjacent the windshield 34. The shorter of the tethers 50 may extend from the knee chamber 18 to a location spaced downwardly from the location on the head chamber 22 where the longer of the tethers 50 is attached to the head chamber 22.

In one example, as shown in FIG. 3, the pair of tethers 50 may be spaced cross-vehicle from each other. In such an example, the shorter of the tethers 50 may be spaced cross-vehicle from the longer of the pair of tethers 50. In a second example, as shown in FIGS. 2 and 4, the pair of tethers 50 are aligned with each other along a vehicle-longitudinal axis. In such an example, each of the tethers 50 may be spaced from each other along the vehicle-longitudinal axis and not spaced from each other cross-vehicle.

At least one of the tethers 50 abuts the dash 14 when the airbag 16 is in the inflated position. In the examples shown in the Figures, the longer of the pair of tethers 50 abuts the dash 14 when the airbag 16 is in the inflated position. The tether 50 may extend from the knee chamber 18 and wrap around the dash 14 to the head chamber 22. As discussed above, the tethers 50 maintains the shape of the inflation chambers 18, 20, 22 when the airbag 16 is in the inflated position.

As shown in the Figures, the airbag 16 may include a second pair of tethers 52 external to the chambers. The second pair of tethers 52 extend from the knee chamber 18 to the head chamber 22. The pair of tethers 50 and the second pair of tethers 52 may be spaced cross-vehicle from each other. Specifically, the second pair of tethers 52 is spaced vehicle-inboard from the pair of tethers 50. In other words, the pair of tethers 50 may be on an outboard side of the airbag 16 and the second pair of tethers 52 may be on the inboard side of the airbag 16.

The airbag 16, including the inflation chambers 18, 20, 22 and the tethers 50, 52, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a dash;
an airbag supported by the dash and being inflatable to an inflated position;
the airbag including a knee chamber, a chest chamber supported by the knee chamber in the inflated position, and a head chamber supported by the chest chamber in the inflated position;
the chest chamber being connected to the knee chamber at a lower seam that defines a lower fluid pathway;
the head chamber being connected to the chest chamber at an upper seam that defines an upper fluid pathway;
an inflator supported by the dash and being connected directly to the knee chamber; and
the airbag including a first pair of tethers external to the chambers, each of the tethers of the first pair of tethers extending from the knee chamber to the head chamber.

2. The assembly of claim 1, wherein the chest chamber is connected to the inflator through the knee chamber and the lower seam.

3. The assembly of claim 1, wherein the head chamber is connected to the inflator through the chest chamber and the upper seam.

4. The assembly of claim 1, wherein the knee chamber, the chest chamber, and the head chamber each have a pressure in a fully inflated position, the pressure of the head chamber being less than the pressure of the knee chamber in the fully inflated position.

5. The assembly of claim 4, wherein the pressure of the chest chamber is different than the pressure of the knee chamber and the head chamber in the fully inflated position.

6. The assembly of claim 1, wherein one of the knee chamber, the chest chamber, and the head chamber includes a first vent and another of the knee chamber, the chest chamber, and the head chamber includes a second vent sized differently than the first vent.

7. The assembly of claim 1, wherein the first pair of tethers are spaced cross-vehicle from each other.

8. The assembly of claim 7, wherein the first pair of tethers are aligned with each other along a vehicle-longitudinal axis.

9. The assembly of claim 1, wherein at least one of the tethers of the first pair of tethers abuts the dash when the airbag is in the inflated position.

10. The assembly of claim 1, further comprising a second pair of tethers external to the chambers and spaced vehicle-inboard from the first pair of tethers, the second pair of tethers extending from the knee chamber to the head chamber.

11. The assembly of claim 1, further comprising a seat, the airbag being between the dash and the seat in the inflated position.

12. The assembly of claim 11, wherein:
the seat defines an occupant knee area, an occupant chest area, and an occupant head area; and
the knee chamber being between the dash and the occupant knee area;
the chest chamber being between the dash and the occupant chest area; and
the head chamber being between the dash and the occupant head area.

13. The assembly of claim 1, further comprising a windshield extending upwardly from the dash, the head chamber extending from the chest chamber to the windshield.

14. The assembly of claim 1, wherein the chest chamber extends vehicle-rearward of the knee chamber and the head chamber.

15. An airbag comprising:
a knee chamber;
a chest chamber connected to the knee chamber at a lower seam that defines a lower fluid pathway;
a head chamber connected to the chest chamber at an upper seam that defines an upper fluid pathway;
an inflator connected directly to the knee chamber; and
a first pair of tethers external to the chambers, each of the tethers extending from the knee chamber to the head chamber.

16. The airbag of claim 15, wherein the chest chamber is connected to the inflator through the knee chamber and the lower seam.

17. The airbag of claim 15, wherein the head chamber is connected to the inflator through the chest chamber and the upper seam.

18. The airbag of claim 15, wherein the knee chamber, the chest chamber, and the head chamber each have a pressure in a fully inflated position, the pressure of the head chamber being less than the pressure of the knee chamber in the fully inflated position.

19. The airbag of claim 15, wherein the tethers are spaced cross-vehicle from each other.

20. The airbag of claim 15, further comprising a second pair of tethers external to the chambers and spaced vehicle-inboard from the first pair of tethers, the second pair of tethers extending from the knee chamber to the head chamber.

* * * * *